Dec. 1, 1925.    1,563,382
J. W. LEGG
GRAPHIC RECORDING DEVICE
Filed Jan. 5, 1923    2 Sheets-Sheet 1
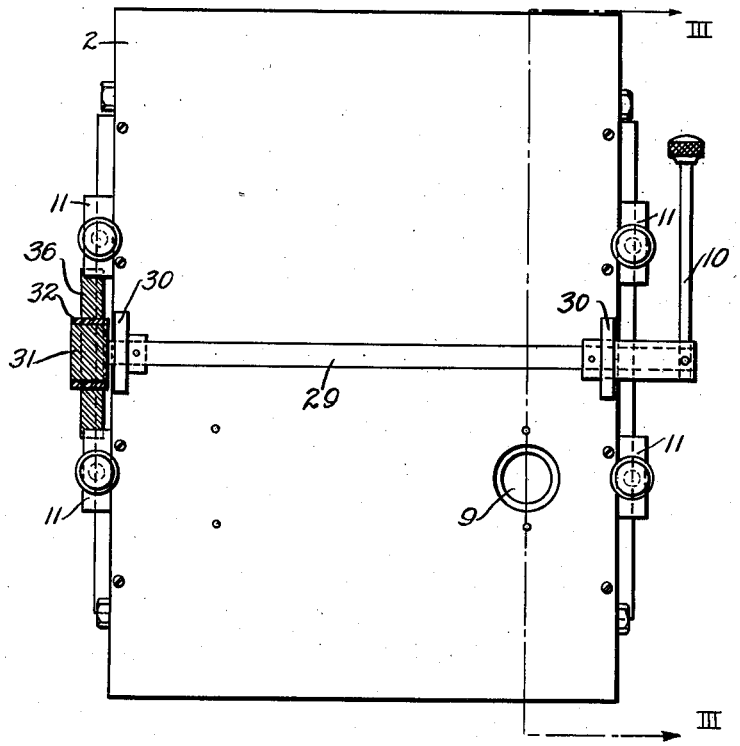
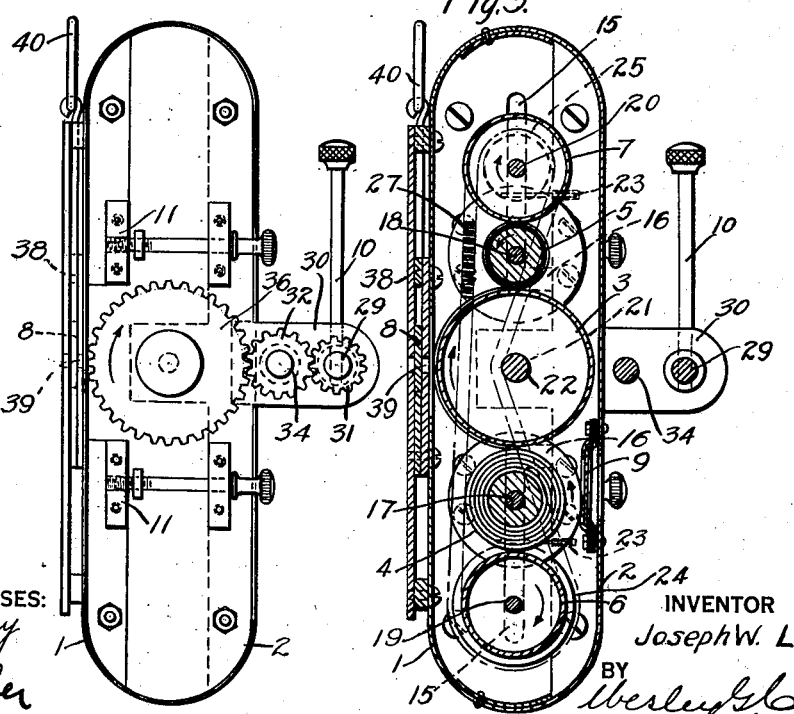
INVENTOR
Joseph W. Legg
BY
ATTORNEY

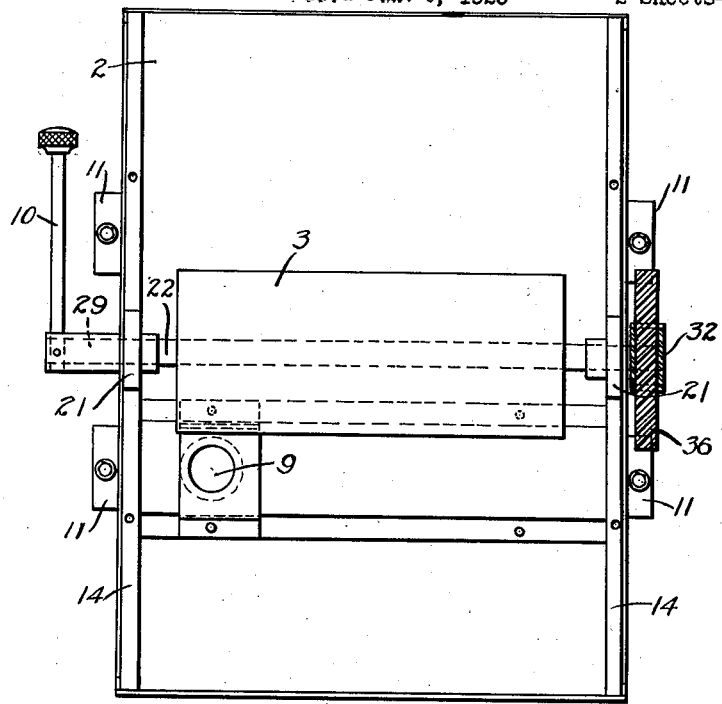
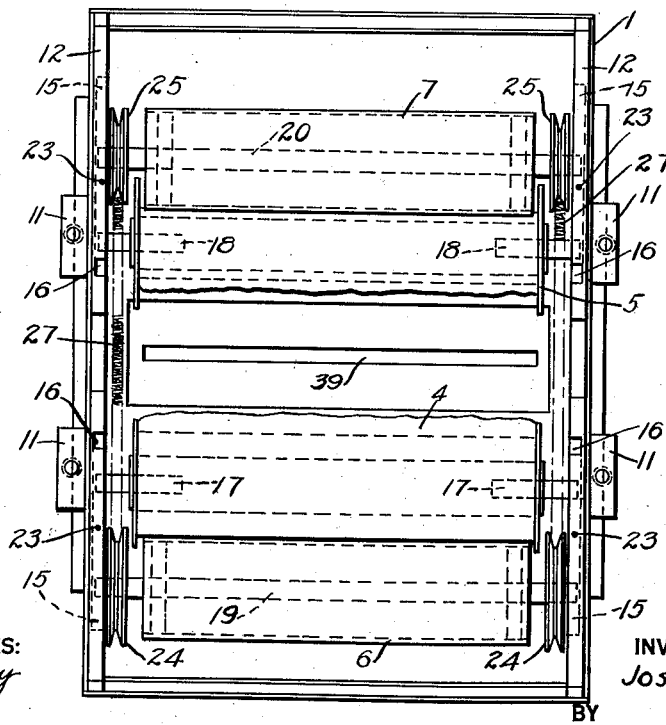

Patented Dec. 1, 1925.

1,563,382

UNITED STATES PATENT OFFICE.

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA.

GRAPHIC RECORDING DEVICE.

Application filed January 5, 1923. Serial No. 610,954.

*To all whom it may concern:*

Be it known that I, JOSEPH W. LEGG, a citizen of the United States, and a resident of Wilkinsburg, in the county of Allegheny and State of Pennsylvania, have invented a new and useful Improvement in Graphic Recording Devices, of which the following is a specification.

My invention relates to graphic recording devices and particularly to film holders for oscillographs.

One object of my invention is to provide a device of the above-indicated character in which the operations of loading and unloading a recording chart or film shall be greatly facilitated.

Another object of my invention is to provide a graphic-recording device in which a movable record chart shall be maintained under constant tension.

Another object of my invention is to provide a film holder for an oscillograph that shall be adapted to utilize the standard film rolls of ordinary cameras.

A further object of my invention is to provide a device for transferring a roll of flexible film or other recording chart from one spool to another that shall be simple and durable in construction and effective in its operation.

In recording instruments, such as graphic meters and oscillographs, employing flexible charts or films that are fed from one spool or roller to another, it is desirable to maintain the chart or film taut as it passes into record-receiving position. By reason of the changing diameters of the rollers, caused by the unwinding of the chart from the supply roller and the winding of the chart upon the take-up roller, the problem of maintaining the proper tension in the chart has been a difficult one.

Various suggestions, including slip clutches, idler rollers bearing against the drive belts of the take-up rollers and means for continuously changing the angular velocity of the take-up roller, have been made but most of these are relatively complicated and expensive in construction or ineffective in operation.

In practicing my invention, I provide a film or chart feeding device in which the chart is moved at a constant linear velocity and in which a constant urging or pulling force at the take-up end of the chart and a constant retarding force at the feed or supply end of the chart permit the chart to pass its record-receiving position under a constant tension, irrespective of changes in the diameters of the supply and take-up rollers.

In addition to the above-mentioned tensioning feature, I provide a device that is adapted to employ standard camera film rolls, that is readily adapted for use in connection with a recording instrument, such as an oscillograph, and that is portable and compact, easy to manipulate and effective in its operation.

Figure 1 of the accompanying drawings is a rear elevational view of a device embodying my invention;

Fig. 2 is a side view, as seen from the left, of the device shown in Fig. 1;

Fig. 3 is a view taken along the line III—III of Fig. 1;

Fig. 4 is an elevational view looking into the lid or cover portion of the device shown in the other figures, and Fig. 5 is a view similar to Fig. 4 looking into the main receptacle or container portion of the device.

The device comprises, in general, a main receptacle or container 1, a lid or cover member 2, a main driving drum or roller 3 mounted in the cover member 2, a feed or supply roller 4 and a take-up roller 5 mounted in the container 1, idler rollers 6 and 7 also mounted in the container 1, a shutter device 8, an observation window 9, an operating member 10 and fastening devices 11 for securing the lid 2 to the container 1.

The container 1 and the lid 2 are preferably constructed of thin-sheet metal in the form of an ordinary pocket camera having side members 12 and 14, respectively, of slightly thicker construction.

The side members 12 of the container 1 are provided with inner grooves or slots 15 of substantially L-shape, the longer arms of which extend longitudinally of the container and the shorter arms 16 of which extend to one edge of the container for the reception of trunnions 17 and 18 of the rollers 4 and 5, respectively, and shafts 19 and 20 of the rollers 6 and 7, respectively.

A shaft 22 of the roller 3 is mounted in bearing projections 21 on the side members 14 of the cover member 2 which extend into recesses in the side members 12 of the container 1.

When the roller 3 is in operative position, as shown, the trunnions 17 and 18 are prevented from withdrawal from the entrances or shorter arms 16 of the grooves 15 by reason of the fact that the rollers 4 and 5 have been forced further apart by the roller 3. Pins 23 limit the inward movement of the shafts 19 and 20 along the grooves 15.

Pulleys 24 and 25, mounted to rotate with the idler rollers 6 and 7, respectively, are adapted to receive a pair of elastic belts 27 that are preferably constructed of helically-wound piano wire. The pulley 24 is slightly larger in diameter than the pulley 25, for a purpose to be hereinafter pointed out.

The operating member 10 is radially mounted on one end of a shaft 29 that is mounted in projections 30 on the side members 14 of the cover member 2 and is provided, at its other end, with a gear wheel 31. The latter engages an idler gear wheel 32 that is supported, by a shaft 34, on one or both of the projections 30 and which engages a gear wheel 36 on the shaft 22 of the drive roller 3.

The shutter device 8 comprises a vertically slidable member of sheet material that is maintained in position against one side of the container 1 by guide members 38 and is adapted to open and to close a horizontal slot 39 opposite the roller 3. A link operating handle member 40 is provided at the upper portion of the shutter device 8.

When loading the device, assuming the cover member 2 with its appended parts including the main drive roller 3 to be removed, the belts 27 will be in contracted condition and the shafts 19 and 20, thereby in the innermost positions thereof against the pins 23.

The feed or supply roller 4, which may comprise a standard camera film cartridge, and the take-up roller 5, which may comprise an empty spool or a similar cartridge, are then slipped into the grooves 15 through the entrance arms 16 thereof.

Where the above-mentioned standard camera cartridge and spool are employed, the trunnions 17 will constitute extra members to fit such cartridge and spool. The supply roll 4 will then be slightly unrolled, as in the usual camera loading operation, in the counter-clockwise direction, as viewed in Fig. 3, to start the film toward the take-up roller 5. After the first few inches of the roll, which usually consists of paper only, alternate layers of film and paper unroll simultaneously across the space between the rollers 4 and 5, with the layer of film to the left, as viewed in Fig. 3. Thus, since the roller 3 is inserted between the rollers 4 and 5, to force the latter slightly farther apart, the film side of the roll will be forced to a position adjacent to the slot 39 and the composite film roll will pass over the left half of the periphery of the roller 3. Also, as the roller 3 is inserted in position, the right side of the belt 27 will be depressed, as shown, by the shaft 22.

Since all of the rollers are in positive rolling engagement, when the drive roller is rotated, the linear velocity of the film and of any point on the perimeter of any of the rollers will be the same, irrespective of the decreasing diameter of the supply roller 4 and of the increasing diameter of the take-up roller 5. Since the shafts of all of the rollers, except the shaft 22 of the roller 3, are floating shafts, the change in the diameters of the rollers 4 and 5 will be readily compensated for.

Since, as above stated, the peripheral velocity of all of the rollers is the same and the diameters of the idler rollers 6 and 7 are the same, the latter will rotate at the same number of revolutions per unit of time. Hence, since the pulley 24 is larger in diameter than the pulley 25, the former will have a higher peripheral velocity than the latter. This condition, causes the flexible belt 27 to have a greater tension on the right side than on the left side, as viewed in Fig. 3, and, as may be seen from the directional arrows of the rollers, tends to retard the rotation of the roller 6 and to assist the rotation of the roller 7. The value of the difference in tension in the two sides of the belt 27 is designed to be somewhat less than the friction between the rollers, hence, the film is maintained taut, without slippage between the rollers.

The device, as a whole, is adapted, in this instance, to be mounted on an oscillograph and the member 10 to be rotated, by the oscillograph mechanism, at a constant speed. However, since the oscillograph forms no part of this invention, it is not deemed necessary to describe the same.

While I have shown and described a particular form of my invention, various changes may be made therein without departing from the spirit and scope of my invention as set forth in the appended claims.

I claim as my invention:

1. A graphic-recording device comprising a rotatable drive member, record-chart feed and take-up rollers for rolling operative connection thereto, an idler roller for similar operative connection to each of said chart rollers and means operatively connecting said idler rollers.

2. A graphic-recording device comprising a rotatable drive member, record-chart feed and take-up rollers for rolling operative connection thereto, an idler roller for similar operative connection to each of said chart rollers and means operatively connecting said idler rollers tending to assist the rotation of the one and to retard the rotation of the other.

3. The combination with supply and take-up rollers for an inextensible, flexible element, of means for rotating said rollers at equal constant perimetral velocities, and means operatively connected between the rollers tending to increase the speed of the take-up roller and to retard the supply roller to maintain a certain constant tension in the flexible element between the rollers.

4. A graphic-recording device comprising a drive roller, record-chart supply and take-up rollers for rolling operative engagement therewith and having floating axes and an elastic belt operatively connecting said supply and take-up rollers independently of said drive roller.

5. A graphic-recording device comprising a drive roller, record-chart supply and take-up rollers for rolling operative engagement therewith and having floating axes, idler rollers for rolling operative engagement with the supply and take-up rollers and having floating axes and an elastic belt operatively connecting the idler rollers.

6. A graphic-recording device comprising a drive roller, record-chart supply and take-up rollers for rolling operative engagement therewith and having floating axes, idler rollers for rolling operative engagement with the supply and take-up rollers and having floating axes, pulleys of different diameters for rotation with the idler rollers and an elastic belt operatively connecting the pulleys.

7. A graphic-recording device comprising a constant-speed rotative drive member, flexible record-chart supply and take-up rollers disposed adjacent thereto and having laterally floating axes parallel to the axis thereof, idler rollers for engagement with the supply and take-up rollers and having laterally-floating axes parallel to the axes thereof, pulleys or gear members of different diameters for rotation with the idler rollers and an elastic belt or the like operatively connecting the pulleys.

8. A graphic-recording device comprising a container having separable portions, record-chart supply and take-up rollers operatively mounted in one of said portions, and actuating means for said rollers supported in another of said portions.

9. A graphic-recording device comprising a container having separable portions, record-chart supply and take-up rollers having floating axes and mounted in one of said portions, means tending to force said rollers toward each other and an actuating roller for said rollers supported in another of said portions and adapted to be placed between the supply and the take-up rollers against the action of said forcing means.

10. A graphic-recording device comprising a container having separable portions, record-chart supply and take-up rollers having floating axes and mounted in one of said portions, idler rollers having floating axes and mounted in said portion against the supply and take-up rollers, respectively, an elastic belt operatively connecting said idler rollers and an actuating roller supported in another of said portions for disposition between the supply and take-up rollers.

11. A graphic-recording device comprising a constant-speed drive roller, flexible record-chart supply and take-up rollers disposed on opposite sides thereof for operative engagement therewith and having floating axes, idler rollers of the same diameter for engagement with the supply and take-up rollers, respectively, and having floating axes, the axes of all of said rollers being in substantially the same plane, pulleys of different diameters for rotation with the idler rollers and an elastic belt connecting the pulleys to hold the floating rollers in operative position and to exert a constant tension on the chart.

In testimony whereof, I have hereunto subscribed my name this 18th day of December, 1922.

JOSEPH W. LEGG.